(12) United States Patent
Bartek

(10) Patent No.: US 7,442,270 B2
(45) Date of Patent: *Oct. 28, 2008

(54) HIGHLY REFLECTIVE ASPHALT-BASED ROOFING MEMBRANE

(75) Inventor: Robert Bartek, Centennial, CO (US)

(73) Assignee: Johns Manville, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 11/432,452

(22) Filed: May 11, 2006

(65) Prior Publication Data

US 2006/0201610 A1 Sep. 14, 2006

Related U.S. Application Data

(62) Division of application No. 10/659,002, filed on Sep. 10, 2003, now Pat. No. 7,070,844.

(51) Int. Cl.
B29C 65/52 (2006.01)
B32B 37/12 (2006.01)
B32B 37/24 (2006.01)

(52) U.S. Cl. .................. 156/278; 156/289; 156/307.3; 156/307.7; 427/430.1; 427/434.2

(58) Field of Classification Search ............. 156/71, 156/278, 289, 307.3, 307.7; 427/430.1, 434.2, 427/434.6, 434.7
See application file for complete search history.

(56) References Cited

U.S. PATENT DOCUMENTS

| | | | | |
|---|---|---|---|---|
| 4,055,453 A | * | 10/1977 | Tajima et al. | 156/279 |
| 4,442,148 A | * | 4/1984 | Stierli | 428/40.3 |
| 4,755,409 A | * | 7/1988 | Harkness | 428/40.3 |
| 5,434,009 A | * | 7/1995 | Urbanek | 428/489 |
| 6,872,440 B1 | * | 3/2005 | Kiik et al. | 428/141 |
| 6,924,015 B2 | * | 8/2005 | Zanchetta et al. | 428/40.1 |
| 2004/0241369 A1 | * | 12/2004 | Pressutti et al. | 428/40.1 |

* cited by examiner

Primary Examiner—Philip C Tucker
Assistant Examiner—Sing P Chan
(74) Attorney, Agent, or Firm—Robert D. Touslee

(57) ABSTRACT

A prefabricated asphalt-based waterproof roofing membrane for use in a multi-ply asphalt-based commercial roofing system, e.g. a cap sheet that forms the exposed layer of a multi-ply built-up roofing system, is manufactured at a factory to have a highly reflective thermoplastic elastomeric sheet layer with a top surface that has a reflectance that meets current EPA Energy Star requirements. Preferably, a polymer primer layer is interposed between the highly reflective thermoplastic elastomeric sheet layer and an asphalt saturated and coated reinforcing substrate to keep oils and other colored components in the asphalt from exuding into the highly reflective thermoplastic elastomeric sheet layer.

4 Claims, 2 Drawing Sheets

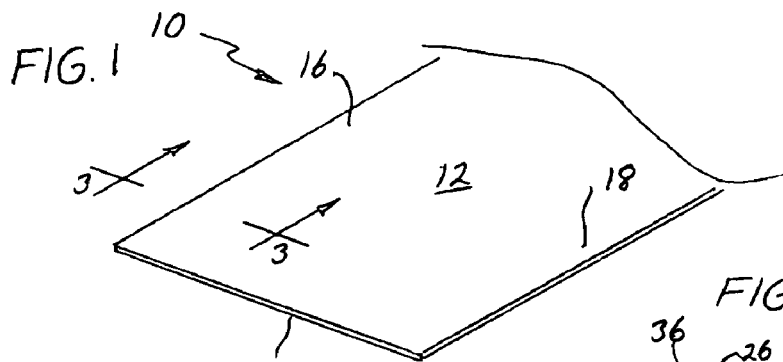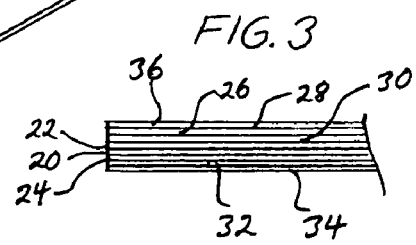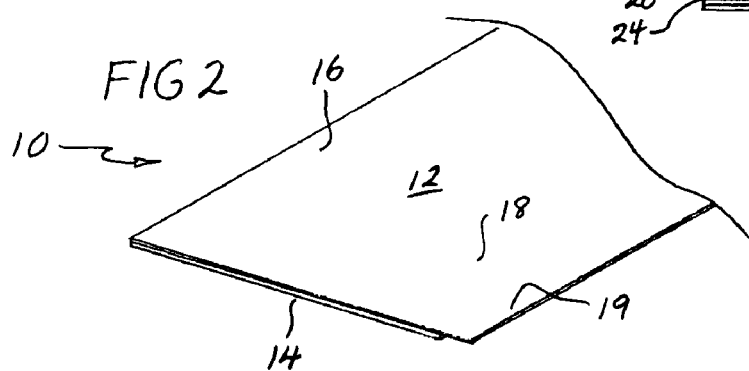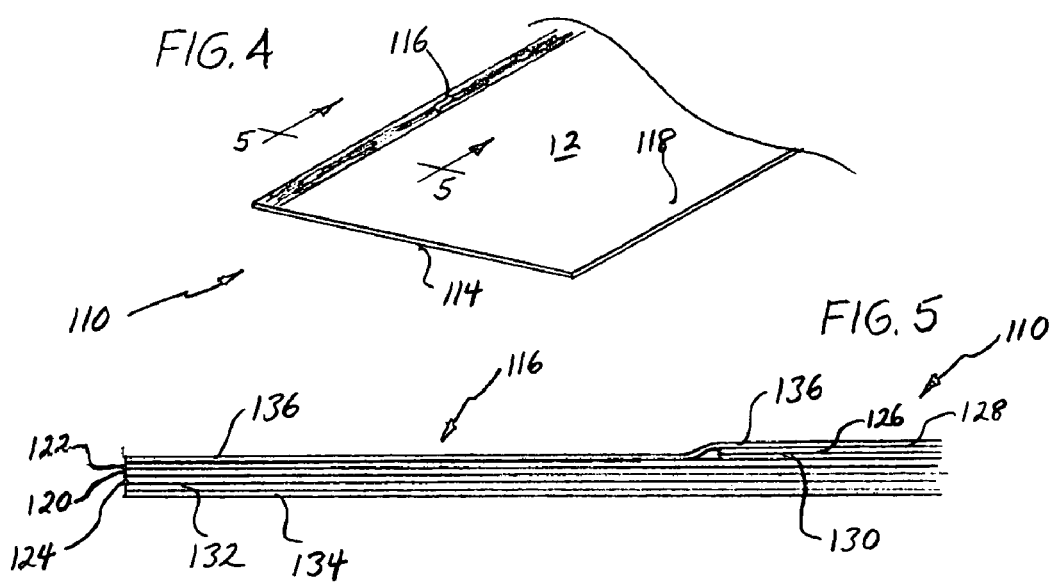

HIGHLY REFLECTIVE ASPHALT-BASED ROOFING MEMBRANE

This application is a division of application Ser. No. 10/659,002, filed Sep. 10, 2003 now U.S. Pat. No. 7,070,844.

BACKGROUND OF THE INVENTION

The subject invention relates to asphalt-based waterproof roofing membranes used in multi-ply asphalt-based commercial roofing systems and, in particular, to a prefabricated asphalt-based waterproof roofing membrane for use in a multi-ply asphalt-based commercial roofing system, e.g. a cap sheet that forms the exposed layer of a multi-ply built-up roofing system, that is manufactured at a factory to have a highly reflective upper surface to meet EPA Energy Star requirements.

Asphalt-based waterproof roofing membranes, such as cap sheets, are currently manufactured in a process that includes several major process steps. The process steps for producing these black asphalt-based waterproof roofing membranes include: saturating a reinforcing substrate with asphalt (bitumen), typically an oxidized or modified asphalt (bitumen); building up layers of asphalt on both major surfaces of the reinforcing substrate until the asphalt saturated and coated reinforcing substrate formed attains a desired thickness; applying granules, release agents or release films, or a combination of granules and release agents or release films to at least one major surface of the asphalt-based waterproof roofing membrane; winding the finished asphalt-based waterproof roofing membrane into a roll; and packaging the roll of asphalt-based waterproof roofing membrane for storage and shipment to a job site. The process steps of saturating the reinforcing substrate with black asphalt, e.g. an oxidized or modified asphalt, and building up layers of asphalt on both major surfaces of the reinforcing substrate may occur simultaneously. Typically, the reinforcing substrate used in the asphalt-based waterproof roofing membrane is a non-woven fiberglass mat, a reinforced fiberglass mat, a non-woven polyester mat, a reinforced polyester mat, a veiled scrim of various fiber combinations, or a laminated composite of two or more of the preceding reinforcing substrates that provide the asphalt-based waterproof roofing membrane with the necessary strength and flexibility.

In a typical manufacturing process, the reinforcing substrate is passed through a saturator/coater where the reinforcing substrate is saturated and coated with asphalt at temperatures from 300 to 425° F. The asphalt typically contains asphalt and mineral fillers and may contain modifiers, such as thermoplastics [Amorphous Polypropylene (APP)], rubbers [Styrene-Butadiene-Styrene (SBS)], and other polymers, antioxidants, resins, oils, etc. Where the saturator and coater units are separate, the asphalts used in the saturator unit to saturate the reinforcing substrate and in the coater unit to coat the reinforcing substrate and build up the thickness of the asphalt saturated and coated substrate may have the same composition or different compositions.

The reinforcing substrate is typically saturated and coated with asphalt by dipping the reinforcing substrate into a tank of the asphalt or by spreading asphalt over the top surface of the substrate as it passes through a coater. Squeeze rollers and other rollers in the coater apply the asphalt to the bottom surface of the sheet and distribute the asphalt evenly over the top and bottom surfaces of the reinforcing substrate to form built up layers of asphalt on the top and bottom surfaces of the reinforcing substrate.

After passing through the saturator/coater unit or the separate saturator and coater units, surfacing materials are typically adhered to both the top and bottom surfaces of the asphalt saturated and coated reinforcing substrate. In some processes, the asphalt saturated and coated reinforcing substrate may pass through a cooling unit where the asphalt saturated and coated reinforcing substrate is cooled prior to applying surfacing materials to the asphalt saturated and coated reinforcing substrate. Typically, the surfacing materials are applied to the asphalt saturated and coated reinforcing substrate by first passing the asphalt saturated and coated reinforcing substrate through a top surfacing unit. In the top surfacing unit, granules or other surfacing materials are applied to the top surface of the asphalt saturated and coated reinforcing substrate. With the desired surfacing material(s) applied to the top surface of the asphalt saturated and coated reinforcing substrate, the asphalt saturated and coated reinforcing substrate passes over a first press drum where the surfacing materials applied to the top surface of the asphalt saturated and coated reinforcing substrate are pressed into the asphalt layer on the top surface of the asphalt saturated and coated reinforcing substrate to assure good adhesion between the surfacing materials and the asphalt layer. As the asphalt saturated and coated reinforcing substrate passes over the first press drum, the asphalt saturated and coated reinforcing substrate is flipped simultaneously with the pressing operation so that the bottom surface of the asphalt saturated and coated reinforcing substrate is facing upward. This permits the application of surfacing materials (such as sand, other minerals (e.g. mica, talc, etc.), chemical release agents, and/or polymeric films) to the bottom surface of the asphalt saturated and coated reinforcing substrate by a bottom-surfacing unit. The asphalt saturated and coated reinforcing substrate then passes over a second press drum where the surfacing materials applied to the bottom surface of the asphalt saturated and coated reinforcing substrate are pressed into the asphalt layer on the bottom surface of the asphalt saturated and coated reinforcing substrate to assure good adhesion between the surfacing materials and the asphalt layer. The second press drum returns the asphalt saturated and coated reinforcing substrate to its normal orientation.

After the application of the surfacing materials to the top and bottom surfaces of the asphalt saturated and coated reinforcing substrate, the surfaced asphalt saturated and coated reinforcing substrate is cooled rapidly by water-cooled rolls and/or water sprays. The surfaced asphalt saturated and coated reinforcing substrate is then passed through a drying section where the surfaced asphalt saturated and coated reinforcing substrate is typically air dried to finish the manufacture of the asphalt-based waterproof roofing membrane. The finished asphalt-based waterproof roofing membrane is then fed through a looper or accumulator section to permit the continuous movement of the finished asphalt-based waterproof roofing membrane during the cutting and winding operation where the finished asphalt-based waterproof roofing membrane is cut into selected lengths and wound into rolls for packaging, storage, and shipment to a job site.

The ever increasing consumption of energy to cool buildings, coupled with global and regional environmental warming issues, has caused a conversion in contemporary roofing technologies to roofing with more reflective top surfaces so that the roofing better reflects solar radiation to thereby reduce the amount of solar radiation absorbed by the roofing and the amount of energy required to cool buildings. Contemporary roofing technologies typically increase the reflectivity of the top surface of the roofing by making the top surface (the exposed surface) of the roofing white.

Due to their irregular granular top surfaces and the inter-granule spaces that reveal the black light-absorbing asphalt surfaces to which the granules are adhered, asphalt-based waterproof roofing membranes, such as cap sheets, currently on the market do not meet EPA Energy Star reflective requirements as measured by ASTM standard E-903—Standard Test Method for Solar Absorptance, Reflectance, and Transmission of Materials Using Integrating Spheres. The current technology used at the job site to upgrade asphalt-based waterproof roofing membranes and provide these roofing membranes with more reflective top surfaces involves covering the exposed surfaces of the roofing membranes with a reflective coating at the job site. This procedure leads to several problems: a waiting period of up to 30 days before the coating can be applied to the top surface of the membrane; the cost of and time required to clean the top surface of the membrane before applying the coating to the top surface of the membrane; the cost of and time involved in the labor intensive application of the coating to the top surface of the membrane; the quality and/or consistency of the application of the coating to the top surface of the membrane which is dependent on the skill and conscientiousness of the laborer; the limited service life of such coatings on the top surface of the membrane; and the requirement of periodic maintenance and reapplication of the coating to the top surface of the membrane. The problems associated with applying white coatings at the job site to the top surfaces of asphalt-based waterproof roofing membranes, plus the ease with which single-ply roofing membranes, such as polyvinyl chloride and thermoplastic olefin single-ply roofing membranes, can be made from white compounds, have contributed to market shifts away from multi-ply asphalt-based commercial roofing systems to single-ply membrane roofing systems.

SUMMARY OF THE INVENTION

The method of prefabricating the asphalt-based waterproof roofing membrane and the prefabricated asphalt-based waterproof roofing membrane of the subject invention solve the problems associated with asphalt-based waterproof roofing membranes discussed in the background of the invention by providing an asphalt-based waterproof roofing membrane that is manufactured in a factory with a standardized highly reflective top surface that meets current EPA Energy Star reflective requirements as measured by ASTM standard E-903—Standard Test Method for Solar Absorptance, Reflectance, and Transmission of Materials Using Integrating Spheres. The standardized, prefabricated asphalt-based waterproof roofing membrane of the subject invention can be easily applied at a job site with no need to coat the asphalt-based roofing membrane at the job site to improve the reflectivity of the top surface of the membrane to meet EPA Energy Star requirements as measured by ASTM standard E 903. In the method of manufacturing the prefabricated asphalt-based waterproof roofing membrane of the subject invention, a preformed highly reflective thermoplastic elastomeric sheet is applied to the top surface of a black asphalt saturated and coated reinforcing substrate of the membrane during the manufacture of the asphalt-based waterproof roofing membrane at the factory to provide the asphalt-based waterproof roofing membrane with a highly reflective top surface that meets EPA Energy Star requirements as measured by ASTM standard E 903. In polymer technology, a thermoplastic elastomeric sheet 10 mils or less in thickness is typically referred to as a film. However, as used herein the term "thermoplastic elastomeric sheet" refers to thermoplastic elastomeric sheets equal to or less than 10 mils in thickness as well as thermoplastic elastomeric sheets greater than 10 mils in thickness.

Preferably, the highly reflective top surface of the asphalt-based waterproof roofing membrane is white. The highly reflective top surface of the asphalt-based waterproof roofing membrane can be smooth or embossed to improve the appearance of the top surface and to provide a slip-resistant roofing surface on which the workers can walk.

The preformed highly reflective thermoplastic elastomeric sheet used in the prefabricated asphalt-based waterproof roofing membrane of the subject invention is opaque to protect the underlying asphalt layer of the asphalt saturated and coated reinforcing substrate of the membrane from the deleterious effects of ultraviolet radiation and may have various additives to improve the performance of the composite, e.g. fungi growth-inhibiting agents, fire retardants, etc. The highly reflective thermoplastic elastomeric sheet of the subject invention is preferably colored with a white pigment, such as titanium dioxide, zinc oxide, aluminum oxide. The preferred polymeric materials used to form for the highly reflective thermoplastic elastomeric (TPE) sheet are polyvinyl chloride (PVC) and those known as thermoplastic olefins (TPO). The highly reflective thermoplastic elastomeric sheet may be reinforced with woven, non-woven, open weave or composite fabrics. Preferably, a polymer primer, which is impermeable to the oils and other components of the asphalt, is applied between the highly reflective thermoplastic elastomeric sheet and the top surface of the asphalt saturated and coated reinforcing substrate to prevent the exuding of the oils and other components from the asphalt into the highly reflective thermoplastic elastomeric sheet and to thereby prevent the oils and other components of the asphalt from staining and otherwise discoloring or adversely affecting the highly reflective thermoplastic elastomeric sheet.

The highly reflective thermoplastic elastomeric sheet is typically applied to the top surface of the asphalt saturated and coated reinforcing substrate after the temperature of the asphalt saturated and coated reinforcing substrate has fallen to about 300° F. or less. Preferably, the highly reflective thermoplastic elastomeric sheet is applied to the upper surface of the asphalt saturated and coated reinforcing substrate to form a laminate and the laminate is then passed over the press drum so that the sheet is pressed into the asphalt saturated and coated reinforcing substrate for better adhesion. If applied, other surfacing materials are typically applied to the highly reflective thermoplastic elastomeric sheet of the laminate formed by the asphalt saturated and coated reinforcing substrate and the highly reflective thermoplastic elastomeric sheet before the laminate is passed over the press drum. The highly reflective thermoplastic elastomeric sheet can extend laterally beyond the asphalt saturated and coated reinforcing substrate for several inches to permit the welding of the side seams of overlapping asphalt-based waterproof roofing membranes of the subject invention in the field. Reflective tapes could also be used to seal the seams. To maintain the cleanliness of the reflective top surface of the asphalt-based waterproof roofing membrane of the subject invention, release films or agents may be applied to the reflective surface of the asphalt-based waterproof roofing membrane prior to winding the asphalt-based waterproof roofing membrane into rolls.

BRIEF DESCRIPTION OF THE DRAWINGS

FIG. 1 is a schematic perspective view of a first embodiment of the asphalt-based waterproof roofing membrane of the subject invention.

FIG. 2 is a schematic perspective view of the first embodiment of the asphalt-based waterproof roofing membrane of the subject invention with the highly reflective top thermoplastic elastomeric sheet layer forming a lateral tab that extends for the length of the membrane.

FIG. 3 is a partial schematic cross section taken substantially along lines 3-3 of FIG. 1, on a larger scale than FIGS. 1 and 2, to illustrate the layers of the asphalt-based waterproof roofing membrane of FIGS. 1 and 2 plus the release sheets.

FIG. 4 is a schematic perspective view of a second embodiment of the asphalt-based waterproof roofing membrane of the subject invention.

FIG. 5 is a partial schematic cross section taken substantially along lines 5-5 of FIG. 4, on a larger scale than FIG. 4, to illustrate the layers of the asphalt-based waterproof roofing membrane of FIG. 4 plus the release sheets.

DESCRIPTION OF THE PREFERRED EMBODIMENTS

Figure 6:
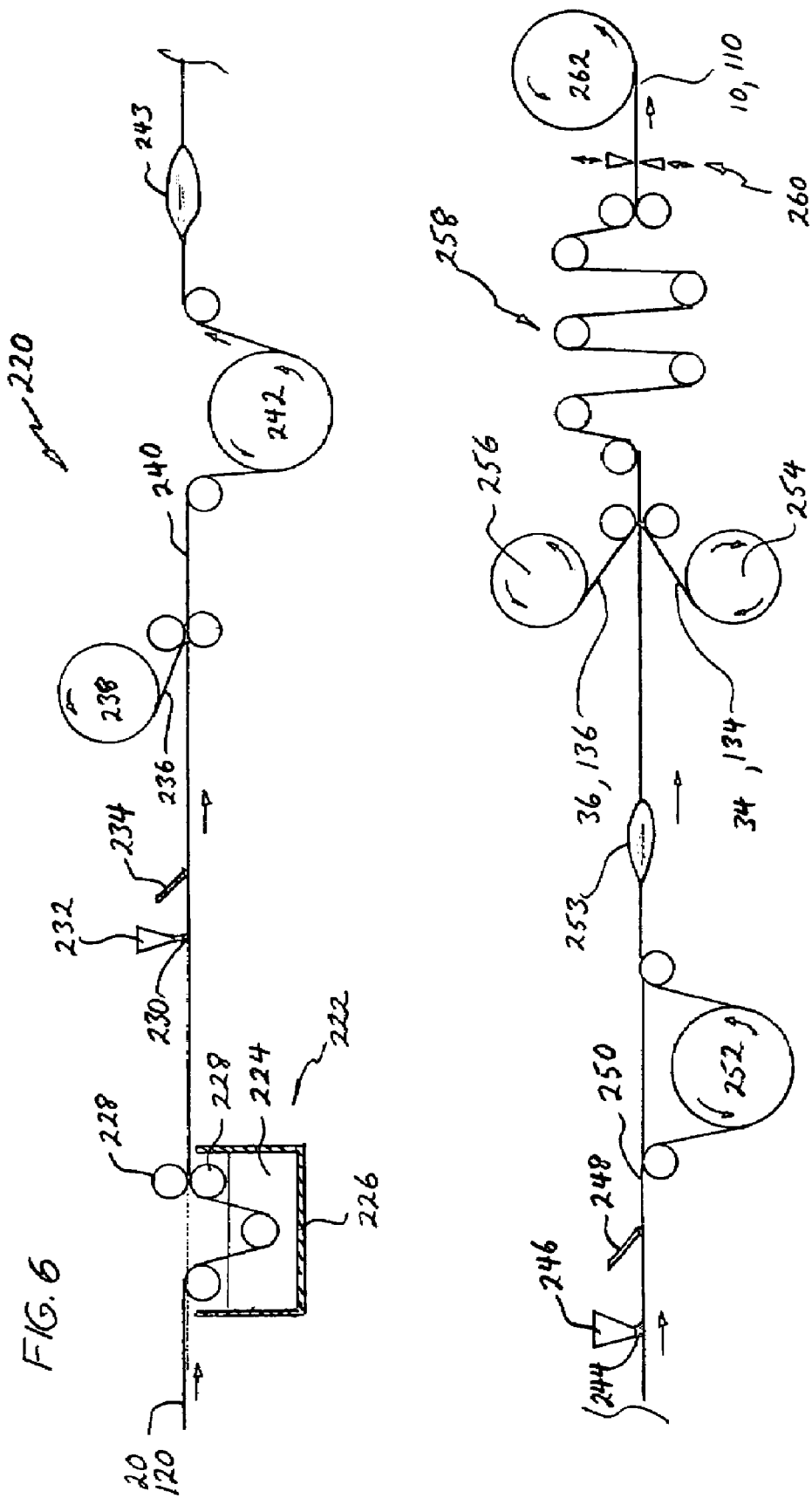
FIG. 6 is a schematic side view of a production line that may be used to practice the method of the subject invention for prefabricating the asphalt-based waterproof roofing membrane of the subject invention.

The prefabricated asphalt-based waterproof roofing membrane 10 of the subject invention, shown in FIGS. 1, 2 and 3, has a top major surface 12 and a bottom major surface 14 that are each defined by the length and width of the membrane 10. The prefabricated asphalt-based waterproof roofing membrane 10 has a lateral edge portion 16, typically called the selvage edge portion of the roofing membrane, which extends for the length of the prefabricated asphalt-based waterproof roofing membrane. The lateral edge portion 16 of prefabricated asphalt-based waterproof roofing membrane 10 is typically about four inches in width and when the prefabricated asphalt-based waterproof roofing membrane 10 is installed on a roof, the top surface of this lateral edge portion 16 is overlapped and sealed to the underside of a lateral edge portion 18 of an adjacent prefabricated asphalt-based waterproof roofing membrane 10 to form a waterproof weather secure seam. The edge portion 18 has substantially the same width as the lateral edge portion 16 and also extends for the length of the prefabricated asphalt-based waterproof roofing membrane 10. Thus, when the prefabricated asphalt-based waterproof roofing membrane 10 is installed on a roof, the top surface of the lateral edge portion 16 is covered by the lateral edge portion 18 of the adjacent prefabricated asphalt-based waterproof roofing membrane while the remainder of the top major surface 12 of the prefabricated asphalt-based waterproof roofing membrane 10 is exposed to the weather. As shown in FIG. 2, the prefabricated asphalt-based waterproof roofing membrane 10 may have a lateral tab 19, extending for the length of the roofing membrane 10, that extends laterally beyond the lateral edge portion 18 of the roofing membrane (e.g. four to twelve inches in width) for welding in the field to other roofing membranes 10 to form waterproof weather secure lateral seams. The prefabricated asphalt-based waterproof roofing membrane 10 is typically between 36 and 40 inches in width (excluding the lateral tab 19) and comes in 1 square (108 square foot) rolls.

The prefabricated asphalt-based waterproof roofing membrane 10 includes: a reinforcing substrate 20; asphalt with which the reinforcing substrate 20 is saturated and which forms top and bottom layers 22 and 24 encapsulating the reinforcing substrate; and a top thermoplastic sheet layer 26 with a highly reflective top surface 28 that is coextensive with or substantially coextensive with the top major surface 12 of the prefabricated asphalt-based waterproof roofing membrane 10 and may be used to form the lateral tab 19. Preferably, the prefabricated asphalt-based waterproof roofing membrane 10 has a polymer primer layer 30, which is impermeable to the oils and other components of the asphalt. The impermeable polymer primer layer 30 is located between the highly reflective thermoplastic elastomeric sheet layer 26 and the top surface of the top asphalt layer 22 to prevent the exuding of oils and other components from the asphalt into the highly reflective thermoplastic elastomeric sheet layer 26 and to thereby prevent the oils and other components of the asphalt from staining and otherwise discoloring or adversely affecting the highly reflective top surface 28 of the thermoplastic elastomeric sheet layer 26. In addition, the prefabricated asphalt-based waterproof roofing membrane 10 normally includes a bottom surface layer 32 formed of conventional mineral surfacing materials, such as but not limited to such as mica, talc, sand, etc.

A release film or sheet 34 may overlie the bottom surface layer 32 of the roofing membrane 10 to keep the bottom major surface 14 of the prefabricated asphalt-based waterproof roofing membrane 10 from adhering to or discoloring the highly reflective thermoplastic elastomeric sheet layer 26 of top major surface 12 of the prefabricated asphalt-based waterproof roofing membrane 10 when the prefabricated asphalt-based waterproof roofing membrane is wound into a roll for packaging, storage, shipment and handling prior to installation. A release film or sheet 36 may overlie the top surface 28 of the highly reflective thermoplastic elastomeric sheet layer 26 and thus the top major surface 12 of the prefabricated asphalt-based waterproof roofing membrane 10 to maintain the cleanliness of the top surface 28 of the highly reflective thermoplastic elastomeric sheet layer 26. Where a release film or sheet 34 is not used on the bottom major surface of the prefabricated asphalt-based waterproof roofing membrane 10, the release film or sheet 36 also functions to keep the bottom major surface 14 of the prefabricated asphalt-based waterproof roofing membrane 10 from adhering to or discoloring the top major surface 12 of the prefabricated asphalt-based waterproof roofing membrane 10 when the prefabricated asphalt-based waterproof roofing membrane is wound into a roll for packaging, storage, shipment and handling prior to installation. The surfaces of the release sheets 34 and 36 in contact with the bottom and top major surfaces of the prefabricated asphalt-based waterproof roofing membrane 10 are treated with conventional release agents, e.g. silicone or some other conventional release agent, so that the sheets 34 and 36 may be easily peeled off of the major surfaces 12 and 14 of the prefabricated asphalt-based waterproof roofing membrane 10 for the installation of the roofing membrane.

The prefabricated asphalt-based waterproof roofing membrane 110 of the subject invention, shown in FIGS. 4 and 5, has a top major surface 112 and a bottom major surface 114 that are each defined by the length and width of the membrane 110. The prefabricated asphalt-based waterproof roofing membrane 110 has a lateral edge portion 116, typically called the selvage edge portion of the roofing membrane, which extends for the length of the prefabricated asphalt-based waterproof roofing membrane. The lateral edge portion 116 of prefabricated asphalt-based waterproof roofing membrane 110 is typically about four inches in width and when the prefabricated asphalt-based waterproof roofing membrane 110 is installed on a roof, the top surface of this lateral edge portion 116 is overlapped and sealed to the underside of a lateral edge portion 118 of an adjacent prefabricated asphalt-based waterproof roofing membrane to form a waterproof weather secure seam. The edge portion 118 has substantially the same width as the lateral edge portion 116 and also extends for the length of the prefabricated asphalt-based waterproof roofing membrane 110. Thus, when the prefabricated asphalt-based waterproof roofing membrane 110 is installed on a roof, the top surface of the lateral edge portion 116 is covered by and sealed to the bottom surface of the lateral edge portion 118 of the adjacent prefabricated asphalt-based waterproof roofing membrane while the remainder of the top major surface 112 of the prefabricated asphalt-based waterproof roofing membrane 110 is exposed to the weather. The prefabricated asphalt-based waterproof roofing membrane 110 is typically between 36 and 40 inches in width and comes in 1 square (108 square foot) rolls.

The prefabricated asphalt-based waterproof roofing membrane 110 includes: a reinforcing substrate 120; asphalt with which the reinforcing substrate 120 is saturated and which forms top and bottom layers 122 and 124 encapsulating the reinforcing substrate; and a top thermoplastic elastomeric sheet layer 126 with a highly reflective top surface 128 that, except for the lateral edge portion 116 which is not overlaid by the top thermoplastic elastomeric sheet layer 126, is coextensive with or substantially coextensive with the remainder of top major surface 112 of the prefabricated asphalt-based waterproof roofing membrane 110. Preferably, the prefabricated asphalt-based waterproof roofing membrane 110 has a polymer primer layer 130, which is impermeable to the oils and other components of the asphalt. The impermeable polymer primer layer 130 is located between the highly reflective thermoplastic elastomeric sheet layer 126 and the top surface of the top asphalt layer 122 to prevent the exuding of oils and other components from the asphalt into the highly reflective thermoplastic elastomeric sheet layer 126 and to thereby prevent the oils and other components of the asphalt from staining and otherwise discoloring or adversely affecting the highly reflective top surface 128 of the thermoplastic elastomeric sheet layer 126. In addition, the prefabricated asphalt-based waterproof roofing membrane 110 includes a bottom surface layer 132 formed of conventional mineral surfacing materials, such as but not limited to such as mica, talc, sand, etc. Preferably, the bottom surface layer 132, except for the lateral edge portion 118, which remains uncoated by the bottom surface layer 132, is coextensive with or substantially coextensive with the remainder of bottom major surface 114 of the prefabricated asphalt-based waterproof roofing membrane 110. This structure is especially well suited for prefabricated asphalt-based waterproof roofing membranes 110 that are to be used in cold-applied roof installations. With this structure, a SBS (Styrene-Butadiene-Styrene) rubber modified bitumen, which is a pressure sensitive adhesive, may be used to form the top and bottom asphalt layers 122 and 124 to thereby enable the overlapping lateral edge portions 116 and 118 of adjacent prefabricated asphalt-based waterproof membranes 110 to be bonded together with a waterproof weather secure seal.

Preferably, a release film or sheet 134 overlies the bottom surface layer 132 and lateral edge portion 118 of the bottom major surface of the roofing membrane 110 to keep the bottom major surface 114 of the prefabricated asphalt-based waterproof roofing membrane 110 from adhering to or discoloring the highly reflective thermoplastic elastomeric sheet layer 126 of top major surface 112 of the prefabricated asphalt-based waterproof roofing membrane 110 when the prefabricated asphalt-based waterproof roofing membrane is wound into a roll for packaging, storage, shipment and handling prior to installation. Preferably, a release film or sheet 136 overlies the top surface 128 of the highly reflective thermoplastic elastomeric sheet layer 126 and the lateral edge portion 116 of the top major surface 112 of the prefabricated asphalt-based waterproof roofing membrane 110 to maintain the cleanliness of the top surface 128 of the highly reflective thermoplastic elastomeric sheet layer 126 and keep the lateral edge portion 116 from adhering to the bottom major surface 114 of the roofing membrane when the prefabricated asphalt-based waterproof roofing membrane is wound into a roll for packaging, storage, shipment and handling prior to installation. Where a release film or sheet 134 is not used on the bottom major surface of the prefabricated asphalt-based waterproof roofing membrane 110, the release film or sheet 136 functions to keep the bottom major surface 114 of the prefabricated asphalt-based waterproof roofing membrane 110 from adhering to or discoloring the top major surface 112 of the prefabricated asphalt-based waterproof roofing membrane 110 when the prefabricated asphalt-based waterproof roofing membrane is wound into a roll for packaging, storage, shipment and handling prior to installation. The surfaces of the release sheets 134 and 136 in contact with the bottom and top major surfaces of the prefabricated asphalt-based waterproof roofing membrane 110 are treated with conventional release agents, e.g. silicone or some other conventional release agent, so that the sheets 134 and 136 may be easily peeled off of the major surfaces of the prefabricated asphalt-based waterproof roofing membrane 110 for installation on a roof.

While the prefabricated asphalt-based waterproof roofing membranes 10 and 110 may include a layer of traditional top surfacing materials, such as granules, talc, sand, etc, on the top surface 28,128 of the highly reflective thermoplastic elastomeric sheet layer 26, 126, the preferred embodiments of the prefabricated asphalt-based waterproof roofing membranes 10, 110 do not include any such layer of traditional top surfacing materials. The presence of such a layer of traditional top surfacing materials could reduce the reflectivity of the top surface 28, 128 of the highly reflective thermoplastic elastomeric sheet layer 26, 126 and thus, the major surface 12, 112 of the prefabricated asphalt-based waterproof roofing membrane 10, 110.

The reinforcing substrates 20, 120 of the prefabricated asphalt-based waterproof roofing membranes 10 and 110 may be any of the conventional reinforcing substrates commonly used in asphalt-based waterproof roofing membranes to provide the membranes with the necessary strength and flexibility, such as, but not limited to: a non-woven fiberglass mat, a reinforced fiberglass mat, a non-woven polyester mat, a reinforced polyester mat, a veiled scrim of various fiber combinations, or a laminated composite of two or more of the preceding reinforcing substrates.

The compositions of the asphalt saturating the reinforcing substrates 20, 120 and forming the top and bottom asphalt layers 22, 24 and 122, 124 on the reinforcing substrates 20, 120 may be any of the conventional asphalt compositions discussed above and/or commonly used in asphalt-based waterproof roofing membranes. These asphalt compositions may include fire retardant chemicals, and typically, range from mineral filled oxidized asphalts to polymer-modified asphalts that are modified with modifiers, such as thermoplastics [Amorphous Polypropylene (APP)], rubbers [Styrene-Butadiene-Styrene (SBS)], and other polymers, antioxidants, resins, oils, etc. The polymer-modified asphalts may also include mineral fillers.

The highly reflective thermoplastic elastomeric sheet layers 26 and 126 are composed of a polymeric material or materials and a reflective pigment or pigments. Preferably the reflective pigment is a white pigment. However, a slight color tinting may be used provided the reflectivity of the upper surfaces 28 and 128 of the thermoplastic elastomeric sheet layers 26 and 126 still met the reflectivity guidelines set forth by EPA Energy Star Requirements. White pigments, such as, but not limited to titanium dioxide, zinc oxide, aluminum oxide, other mineral pigments, or a combination of these pigments in quantities sufficient to make the thermoplastic elastomeric sheet layers 26, 126 both opaque to solar radiation and highly reflective. The pigments in the highly reflective thermoplastic elastomeric sheet layers 26, 126 protect the impermeable polymer primer layers 30 and 130 (when used), the polymeric material or materials of the thermoplastic elastomeric sheet layers 26 and 126, and the underlying substrates formed by the asphalt layers 22, 24 and 122, 124 and the asphalt saturated reinforcing substrates 20 and 120 from the deleterious effects of ultraviolet radiation. The highly reflective thermoplastic elastomeric sheet layers 26 and 126 may also include additional additives that: aid in limiting the growth of fungi during service; improve fire resistance; enhance heat, light and impact stability; improve the flow characteristics of the sheet at the time of extrusion (slip agents, surfactants, thickeners, viscosity depressants, etc.); and reduce the aging rate, discoloration, and dirt adherence of the thermoplastic elastomeric sheets 26 and 126 during service. While the highest reflectance values require the highly reflective thermoplastic elastomeric sheet layers 26 and 126 to have smooth top surfaces 28 and 128, it may be feasible to emboss the top surfaces 28 and 128 of the highly reflective thermoplastic elastomeric sheet layers 26 and 126 to enhance the appearance of the top major surfaces of the prefabricated asphalt-based waterproof roofing membranes 10 and 110 and make the top major surfaces 12 and 112 of the prefabricated asphalt-based waterproof roofing membranes 10 and 110 more slip resistant.

The preferred polymeric materials for the highly reflective thermoplastic elastomeric (TPE) sheet layers 26 and 126 are polyvinyl chloride (PVC) and those known as thermoplastic olefins (TPO). Both of these compounded polymer families have proven histories in commercial roofing applications. However, it is contemplated that other thermoplastic elastomers, such as copolyamides, copolyesters, polyurethane, and styrene copolymers could also be used for the highly reflective thermoplastic elastomeric sheet layers 26 and 126.

The polyvinyl chloride compounds used to form the highly reflective thermoplastic elastomeric sheet layers 26 and 126 are typically composed of blends of different vinyl polymers and copolymers. The polyvinyl chloride polymers may be alloyed with other polymers, such as, ABS, acrylics, polyurethanes, nitrile rubber, and other polymers to improve the properties of the sheet. Preferably, the polyvinyl chloride resins will be plasticized to improve their flexibility by adding phthalates, epoxies, adipates, azelates, trimellitates, phosphates, and other compounds commonly used to plasticize polyvinyl chloride resins. Preferably, the polyvinyl chloride resins will be compounded with ultraviolet radiation absorbers, fire retardants, and other minerals and additives, as described above, to improve the performance of the polyvinyl chloride resins in the field.

The thermoplastic elastomers used to form the highly reflective thermoplastic elastomeric sheet layers 26 and 126 may have a variety of compositions. Polyolefin resins may be derived from crosslinked ethylene-propylene copolymers (EPM) or ethylene-propylene-diene terpolymers (EPDM). The polyolefin resins may also be blends of crosslinked ethylene-propylene copolymers (EPM) or ethylene-propylene-diene terpolymers (EPDM) with polypropylene, polyethylene, or a mixture of polypropylene and polyethylene. These resin blends may be reactor made of compounded. The thermoplastic elastomers will typically be compounded with ultraviolet radiation protectors, biocides, and other minerals and additives commonly used in the production of films and sheets used for roofing applications.

The thermoplastic elastomeric sheet forming the highly reflective top sheet layers 26 and 126 may be either be reinforced, e.g. with woven, non-woven, open weave, or composite mats that are currently used to reinforce membranes for roofing applications, or not reinforced.

The thermoplastic elastomeric sheet forming the highly reflective top sheet layers 26 and 126 may be preformed or formed in-situ when applied to the polymer primer layers 30 and 130 (when used) or the top surfaces of the top asphalt layers 22, 122. The thermoplastic elastomeric sheets 26 and 126 may be formed by any known process for making thermoplastic elastomeric sheets, such as but not limited to, melt extrusion, calendaring, solvent casting, air blowing, chemical conversion, skiving, or a combination of one or more of the preceding methods. The thermoplastic elastomeric sheets forming the highly reflective layers 26 and 126 may be uniaxially or biaxially oriented. Depending on the type of thermoplastic elastomer used, the presence or absence of a reinforcing substrate, and the physical properties, the chemical properties, installation properties, and service life required by the application, the thermoplastic sheets forming the highly reflective top sheet layers 26 and 126 will typically have a thickness between about 2 to 3 mils and about 80 to 100 mils.

In the application of the highly reflective thermoplastic elastomeric sheet layers 26 and 126 to the top asphalt layers 22 and 122 of the roofing membrane 10 and 110, incompatibility between the thermoplastic elastomeric sheets forming layers 26 and 126 and the asphalt (e.g. oxidized or polymer modified asphalt) of the asphalt layers 22 and 122 is a primary concern. This interaction can result in the exudation of oils and other colored components out of the asphalt into the pores or structure of the highly reflective thermoplastic elastomeric sheets forming the layers 26 and 126. The exudation of such oils and other colored components into the highly reflective thermoplastic sheets forming the sheet layers 26 and 126 can cause permanent staining and discoloration of the highly reflective top surfaces 28 and 128 of the sheet layers 26 and 126. In addition, the exudation of such oils into the elastomers of the sheet layers 26 and 126 may also exacerbate the aging rate or otherwise adversely affect the sheet layers 26 and 126. To prevent any significant exudation of oils and other colored components from the asphalt layers 22 and 122 into the highly reflective thermoplastic sheet layers 26 and 126, polymer primer layers 30 and 130 that are impermeable or substantially impermeable to the oils and other colored components of the asphalt in the asphalt layers 22 and 122 may be located intermediate the top surfaces of the asphalt layers 22 and 122 and the bottom surfaces of the highly reflective thermoplastic sheet layers 30 and 130. Suitable polymer primers for the layers 30 and 130 include those containing polyvinyl acetate, polyvinylidene chloride, cured polyacrylonitrile, cellulose polymers, and others such as disclosed in U.S. Pat. No. 4,442, 148, issued Apr. 10, 1984. The disclosure of U.S. Pat. No. 4,442,148 is hereby incorporated herein in its entirety by reference. Other polymer primers than those set forth above that will block or substantially block the exudation of oils and other colored components from the asphalt may also be used to form the polymer primer layers 30 and 130.

The reflectance of the top major surfaces 12 and 112 of the prefabricated asphalt-based waterproof roofing membranes 10 and 110 formed by the top highly reflective surfaces 28 and 128 of the top highly reflective thermoplastic elastomeric sheet layers 26, 126 as measured by ASTM standard E 903—Standard Test Method for Solar Absorptance, Reflectance, and Transmission of Materials Using Integrating Spheres—meet current EPA Energy Star reflective requirements for low-slope roof products. The current EPA Energy Star reflectance requirements are an Initial Solar Reflectance greater than or equal to 0.65 and a Maintenance of Solar Reflectance greater or equal to 0.50 three years after installation under normal conditions. The current test criteria for determining the Initial Solar Reflectance requires the testing of a 3 inch by 3 inch sample of the product in accordance with ASTM E 903 (values for solar absorptance and transmission need not be obtained) using a black background. The current test criteria for determining the Maintenance of Solar Reflectance three years after installation under normal conditions may use any of three test methods set forth in the current EPA Energy Star guidelines including the following test method. A minimum of three (3) samples from three existing roofs on which the product has been installed for a minimum of three years with one of the existing roofs being located within a major metropolitan area such as Atlanta, Boston, Chicago, Dallas, Houston, Los Angles, Miami, Minneapolis, New York, Philadelphia, San Francisco, St. Louis, Washington D.C., etc. At least three (3) measurements of solar reflectance are to be taken from different areas on each sample in accordance with ASTM E 903. The average of all solar reflectance values obtained from the samples will be used to determine the solar reflectance of the weathered roof product. ASTM standard E 903 test method measures solar reflectance by using spectrophotometers that are equipped with integrating spheres. The test method is set forth in ASTM test Designation E 903-96, approved Apr. 10, 1996 and published May 1996. ASTM test Designation E 903-96 is hereby incorporated herein by reference in its entirety.

FIG. 6 schematically illustrates a typical manufacturing line 220 that could be used for making the prefabricated asphalt-based waterproof roofing membranes 10 and 110. As shown in FIG. 6, in the manufacturing process of the subject invention, the reinforcing substrate 20 or 120 may be passed through a standard saturator/coater unit 222 or a standard saturator unit and a standard coater unit (not shown) where the reinforcing substrate 20 or 120 is saturated and coated with asphalt 224 at temperatures typically between 300 to 425° F. The saturator/coater unit 222 of FIG. 5 includes a tank 226 that contains the asphalt 224 and squeeze rollers 228. The asphalt 224 may be any of the asphalt compositions discussed above and/or commonly used in the industry to make asphalt-based waterproof roofing membranes and typically contains asphalt and mineral fillers and may contain modifiers, such as thermoplastics [Amorphous Polypropylene (APP)], rubbers [Styrene-Butadiene-Styrene (SBS)], and other polymers, antioxidants, resins, oils, etc. Where the saturator and coater units are separate, the asphalts used in the saturator unit to saturate the reinforcing substrate 20 or 120 and in the coater unit to coat the reinforcing substrate 20 or 120 and build up the thickness of the saturated and coated substrate 20 or 120 may have the same composition or different compositions.

As shown in FIG. 6, the reinforcing substrate 20 or 120 is saturated and coated with the asphalt 224 by passing the reinforcing substrate 20 or 120 through a pool of asphalt 224 in the tank 226. The thicknesses of the top and bottom asphalt layers 22, 24 or 122, 124 of the asphalt saturated and coated reinforcing substrate 20 or 120 and the overall thickness of the asphalt saturated and coated reinforcing substrate 20 or 120 are then set by passing the saturated and coated reinforcing substrate between the spaced apart squeeze rollers 228. The spaced apart squeeze rollers 228 distribute the asphalt 224 evenly throughout the reinforcing substrate and over the top and bottom surfaces of the reinforcing substrate to form the built up layers of asphalt 22, 24 or 122, 124 on the top and bottom surfaces of the reinforcing substrate 20 or 120.

In the preferred method of the subject invention, a polymer primer layer 30 or 130 that is impermeable or substantially impermeable to the oils and other colored components of the asphalt 224 is then applied to the top surface of the top asphalt layer 22 or 122. The polymer primer material 230 that forms the polymer primer layer 30 or 130 would typically be applied to the top surface of the top asphalt layer 22 or 122 after the top asphalt layer 22 or 122 has been cooled to a temperature below 300° F. To form the polymer primer layer 30 of the roofing membrane 10, the polymer primer material 230 would be poured or sprayed across the entire width of the top surface of the top asphalt layer 22 by an applicator 232. To form the polymer primer layer 130 of the roofing membrane 110, the polymer primer material 230 would not be poured or sprayed onto the lateral edge portion 116, but would be poured or sprayed across the remaining width of the top surface of the top asphalt layer 122 by an applicator 232 with a barrier preventing the primer material from flowing onto the lateral edge portion 116. The pool of polymer primer material 230 thus formed then passes beneath a doctor blade 234 that smoothes the top surface of the polymer primer material and forms the pool of polymer primer material into the polymer primer layer 30 or 130. The polymer primer layer 30 or 130 is then typically air dried or cured prior to applying the highly reflective thermoplastic elastomeric sheet layer 26 or 126. While the technique shown for applying the polymer primer material 230 to the top surface of the top asphalt layer 22 or 122 is a spread coating technique, it is contemplated that the polymer primer material 230 could be applied to the top surface of the top asphalt layer 22 or 122 by other techniques commonly used in the industry, such as but not limited to, dip coating, roll coating, spray coating, and powder coating techniques.

Where the polymer primer material 230 is utilized to provide the membrane 10 or 110 with the polymer primer layer 30 or 130, after the polymer primer layer 30 or 130 is dried, the highly reflective thermoplastic elastomeric sheet 236 that forms the highly reflective thermoplastic elastomeric sheet layer 26 or 126 may be to the top surface the polymer primer layer 30 or 130 from a roll 238. Where the polymer primer material 230 is not utilized to form the polymer primer layer 30 between the asphalt layer 22 and the highly reflective thermoplastic elastomeric sheet layer 26 of the roofing membrane 10, the highly reflective thermoplastic elastomeric sheet 236 that forms the highly reflective thermoplastic elastomeric sheet layer 26 is laid across the entire width of and directly onto the top surface of the top asphalt layer 22. Where the polymer primer material 230 is not utilized to form the polymer primer layer 130 between the asphalt layer 122 and the highly reflective thermoplastic elastomeric sheet layer 126 of the roofing membrane 110, the highly reflective thermoplastic elastomeric sheet 236 that forms the highly reflective thermoplastic elastomeric sheet layer 126 would not be laid onto the lateral edge portion 116, but would be laid across the remaining width of and directly onto the top surface of the top asphalt layer 122. The highly reflective thermoplastic elastomeric sheet layer 26 or 126 is selected to have a desired thickness and smoothness that is sufficient to provide the highly reflective thermoplastic elastomeric sheet layer 26 or 126 and the prefabricated asphalt-based waterproof roofing membrane 10 or 110 with the necessary reflectance. While the highly reflective thermoplastic sheet 236 is shown being applied to the top surface of the polymer primer layer 30, 130 or the top surface of the asphalt layer 22, 122 from the roll 238 in FIG. 6, it is contemplated that the highly reflective thermoplastic elastomeric sheet 236 could be applied to the top surface of the polymer primer layer 30, 130 or the top surface of the asphalt layer 22, 122 by other techniques, such as but not limited to melt extrusion.

With the highly reflective thermoplastic elastomeric sheet layer 26 or 126 applied to the top surface of the asphalt layer 22 or 122 or the top surface of the polymer primer layer 30 or 130, the laminate 240 formed by the asphalt saturated and coated reinforcing substrate 20, 120 with the highly reflective thermoplastic elastomeric sheet layer 26, 126 or the polymer primer layer 30, 130 and the highly reflective thermoplastic elastomeric sheet layer 26, 126 passes around a first press drum 242. As the laminate 240 passes around the first press drum 242, the layers 22, 26 or 22, 30, 26 of the roofing membrane 10 or the layers 122, 126 or 122, 130, 126 of the roofing membrane 110 are pressed together to assure good adhesion between the layers. As or after the laminate 240 passes over the first press drum 242, the laminate is flipped (represented schematically by 243 in FIG. 6) so that the bottom surface of the bottom asphalt layer 24 or 124 of the laminate is facing upward. This permits the application of surfacing materials (such as sand, other minerals (e.g. mica, talc, etc.), chemical release agents, and/or polymeric films) to the bottom surface of the laminate 240.

In FIG. 6, bottom surfacing material(s) 244 that form the bottom surface layer 32 or 132 of the roofing membrane 10 or 110 are shown being poured or sprayed onto the bottom surface of the bottom asphalt layer 24 or 124 by an applicator 246. To form the bottom surface layer 32 of the roofing membrane 10, the surfacing materials 244 would be poured or sprayed across the entire width of the bottom surface of the bottom asphalt layer 24 by an applicator 246. To form the bottom surface layer 132 of the roofing membrane 110, the surfacing materials 244 would not be applied to the lateral edge portion 118, but would be poured or sprayed across the remaining width of the bottom surface of the bottom asphalt layer 124 by an applicator 246 with a barrier preventing the surfacing materials from flowing onto the lateral edge portion 118. The layer of surfacing material(s) thus formed then passes beneath a doctor blade 248 that smoothes the normally bottom surface of the surfacing material(s) and forms the layer of surfacing material(s) into a bottom surface layer 32 or 132 having a desired thickness and smoothness.

The laminate 250 thus formed is then passed around a second press drum 252 where the surfacing materials 244 applied to the normally bottom surface of the asphalt layer 24 or 124 of the laminate 250 are pressed into the bottom surface of the asphalt layer 24 or 124 to assure good adhesion between the surfacing material(s) 244 and the asphalt layer 24 or 124. After the laminate 250 passes over the second press drum 252, the laminate 250 is then flipped (represented schematically by 253 in FIG. 6) and returned to its normal orientation.

After the application of the top layers 22, 26 and the bottom layers 24, 32 or the top layers 22, 30, 26 and bottom layers 24, 32 to the top and bottom surfaces of the asphalt saturated and coated reinforcing substrate 20 or the application of the top layers 122, 126 and the bottom layers 124, 132 or the top layers 122, 130, 126 and bottom layers 124, 132 to the top and bottom surfaces of the asphalt saturated and coated reinforcing substrate 120, the laminate 252 formed is rapidly cooled by water-cooled rolls and/or water sprays to complete the manufacture of the prefabricated asphalt-based waterproof roofing membrane 10 or 110. A bottom release sheet 34 or 134 is applied to the bottom surface layer 32 or 132 and a top release sheet 36 or 136 is applied to the top surface of the highly reflective thermoplastic elastomeric sheet layer 26 or 126 of the prefabricated asphalt-based waterproof roofing membrane 10 or 110 from rolls 254 and 256.

The prefabricated asphalt-based waterproof roofing membrane 10 or 110 is then fed through a looper or accumulator section 258 to permit the continuous movement of the prefabricated asphalt-based waterproof roofing membrane 10 or 110 during the winding and cutting operation. In the cutting and winding operation, the prefabricated asphalt-based waterproof roofing membrane 10 or 110 is periodically cut to a desired length or lengths by a cutting unit 260 and wound into rolls 262 for thermoplastic elastomeric sheet packaging, storage, and shipment to a job site.

Preferably, additional surfacing materials are not applied to the top surface of the highly reflective thermoplastic elastomeric sheet layer 26 or 126. However, after the highly reflective thermoplastic elastomeric sheet layer 26 or 126 is applied to the top asphalt layer 22, 122 or the polymer primer layer 30, 130, the laminate 240 thus formed over the press drum 242, surfacing materials (such as roofing granules, sand, other minerals (e.g. mica, talc, etc.), chemical release agents, and/or polymeric films) may be applied to the top surface 20 or 128 of the highly reflective thermoplastic elastomeric sheet layer 26 or 126. While it is preferred to prefabricate the prefabricated asphalt-based waterproof roofing membrane 10 or 110 in line as described above, it is contemplated that the application of the highly reflective layer 26 or 126 could be effected on a separate process line. However, this would appear to be relatively impractical in that it would add to the number of process steps and the costs of manufacture.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a prefabricated asphalt-based waterproof roofing membrane; the prefabricated asphalt-based waterproof roofing membrane having a length and a width; the prefabricated asphalt-based waterproof roofing membrane having a top major surface and a bottom major surface defined by the length and the width of the prefabricated asphalt-based waterproof roofing membrane; the top major surface of the prefabricated asphalt-based waterproof roofing membrane having an exposed portion that is exposed to the weather when the prefabricated asphalt-based waterproof roofing membrane is installed on a roof and a lateral edge portion, extending for the length of the prefabricated asphalt-based waterproof roofing membrane, that is overlapped by an adjacent prefabricated asphalt-based waterproof roofing membrane when the prefabricated asphalt-based waterproof roofing membrane is installed on a root the method consisting of:

providing a reinforcing substrate having a length and a width; the reinforcing substrate having a top major surface and a bottom major surface defined by the length and the width of the reinforcing substrate;

simultaneously saturating and coating the reinforcing substrate with asphalt to form an asphalt saturated and coated reinforcing substrate with a top asphalt layer overlaying and coextensive with the top major surface of the reinforcing substrate and a bottom asphalt layer overlaying and coextensive with the bottom major surface of the reinforcing substrate;

applying and bonding a highly reflective thermoplastic elastomeric sheet layer only to a first portion of a top major surface of the top asphalt layer of the saturated and coated reinforcing substrate while maintaining a second portion of the top major surface of the top asphalt layer uncovered and exposed to form a lateral edge portion of the prefabricated asphalt-based waterproof roofing membrane that extends for the length of the prefabricated asphalt-based waterproof roofing membrane to be overlapped by and sealed to an underside of an adjacent prefabricated asphalt-based waterproof roofing membrane when the prefabricated asphalt-based waterproof roofing membrane is installed on a root the highly reflective thermoplastic elastomeric sheet layer forming the portion of the top major surface of the prefabricated asphalt-based waterproof roofing membrane that is exposed to the weather when the prefabricated asphalt-based waterproof roofing membrane is installed on a root the highly reflective thermoplastic elastomeric sheet layer having a top surface that has an initial solar reflectance of at least 0.65 and a solar reflectance of at least 0.50 after three years;

applying a polymer primer layer, which is impermeable to oils and other colored components of the top asphalt layer, to the top major surface of the top asphalt layer so that; the polymer primer layer is interposed between the top asphalt layer and the highly reflective thermoplastic elastomeric sheet layer to keep the oils and other colored components of the top asphalt layer from exuding into the highly reflective thermoplastic elastomeric sheet layer and reducing the reflectance of the highly reflective thermoplastic elastomeric sheet layer; the polymer primer layer being bonded the top major surface of the top asphalt layer; and the highly reflective thermoplastic elastomeric sheet layer being bonded to the top major surface of the top asphalt layer by being bonded to a top surface of the polymer primer layer;

subsequent to applying and bonding the highly reflective thermoplastic elastomeric sheet layer to the first portion of the top major surface of the top asphalt layer, applying a release sheet to one of the major surfaces of the prefabricated asphalt-based waterproof roofing membrane that overlays the one major surface so that the prefabricated asphalt-based waterproof roofing membrane can to be wound into a roll for packaging, storage, shipping, and handling without discoloring the highly reflective thermoplastic elastomeric sheet layer and unwound from the roll for installation; and winding the prefabricated asphalt-based waterproof roofing membrane into a roll.

2. The method of making a prefabricated asphalt-based waterproof roofing membrane according to claim 1, wherein:
the highly reflective thermoplastic elastomeric sheet layer comprises a polyvinyl chloride or a thermoplastic olefin and a reflective pigment.

3. The method of making a prefabricated asphalt-based waterproof roofing membrane according to claim 1, wherein:
the highly reflective thermoplastic elastomeric sheet is a preformed sheet.

4. The method of making a prefabricated asphalt-based waterproof roofing membrane according to claim 1, wherein:
the asphalt is a pressure sensitive adhesive asphalt.

* * * * *